United States Patent
Day et al.

(10) Patent No.: US 8,775,412 B2
(45) Date of Patent: Jul. 8, 2014

(54) METHOD AND SYSTEM FOR A SELF-HEALING QUERY ACCESS PLAN

(75) Inventors: Paul Reuben Day, Rochester, MN (US); Brian Robert Muras, Rochester, MN (US); Anne Marie Ryg, Mantorville, MN (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 10/754,010

(22) Filed: Jan. 8, 2004

(65) Prior Publication Data

US 2005/0154740 A1    Jul. 14, 2005

(51) Int. Cl.
*G06F 7/00* (2006.01)
*G06F 17/30* (2006.01)

(52) U.S. Cl.
USPC .......................................... 707/718

(58) Field of Classification Search
USPC .................................. 707/100, 713
See application file for complete search history.

(56) References Cited

U.S. PATENT DOCUMENTS

| | | | | |
|---|---|---|---|---|
| 6,092,099 | A * | 7/2000 | Irie et al. | 709/202 |
| 6,449,341 | B1 * | 9/2002 | Adams et al. | 379/9 |
| 7,146,352 | B2 * | 12/2006 | Brundage et al. | 707/2 |
| 7,159,577 | B2 * | 1/2007 | Haskew et al. | 123/516 |
| 2002/0133504 | A1 * | 9/2002 | Vlahos et al. | 707/104.1 |
| 2002/0198867 | A1 * | 12/2002 | Lohman et al. | 707/3 |
| 2003/0069889 | A1 * | 4/2003 | Ofek | 707/100 |
| 2003/0172368 | A1 * | 9/2003 | Alumbaugh et al. | 717/106 |
| 2004/0267760 | A1 * | 12/2004 | Brundage et al. | 707/100 |
| 2005/0049783 | A1 * | 3/2005 | Hunzinger | 701/208 |
| 2005/0097078 | A1 * | 5/2005 | Lohman et al. | 707/2 |
| 2005/0177557 | A1 * | 8/2005 | Ziauddin et al. | 707/3 |

OTHER PUBLICATIONS

Interim Guidelines for Examination of Patent Applications for Patent Subject Matter Eligibility; Annex IV; pp. 50-57; Nov. 22, 2005.*
Kabra, Navin and DeWitt, David J. "Efficient Mid-Query Optimizations of Sub-Optimal Query Execution Plans." Jun. 1998, ACM Press, pp. 106-117.*
"SQL Package Creation and Distribution," IBM Technical Disclosure Bulletin, vol. 34, No. 7A, Dec. 1991.
Said Elnaffar et al., "Today's DBMSs: How autonomic are they?" Proceedings of the 14th International Workshop on Database and Expert Systems Applications (DEXA '03), Sep. 2003.
Surajit Chaudhuri, "An Overview of Query Optimization in Relational Systems," Proceedings of the 17th AAM Sigact-Sigmod-Sigart Symposium on Principles of Database Systems, Seattle, WA, Jun. 1998.
Goetz Graefe, "Query Evaluation Techniques for Large Databases," ACM Computing Surveys, vol. 25, No. 2, Jun. 1993.

(Continued)

*Primary Examiner* — Kimberly Wilson
(74) *Attorney, Agent, or Firm* — Wood, Herron & Evans LLP

(57) ABSTRACT

A self-healing database engine and optimizer framework support automatically responding to execution errors to allow continued execution of a query plan. Upon encountering an execution error, the database engine automatically initiates a rebuilding of the query plan and executes the rebuilt execution plan. If an error is encountered in the rebuilt query plan then the query implementation methods are analyzed. If a query function is identified for which an alternative implementation method is available, then this alternative implementation method is substituted to create a new query plan. The new query plan is then executed to determine if the error is corrected.

11 Claims, 2 Drawing Sheets

(56) References Cited

OTHER PUBLICATIONS

D. Chamberlin, "A complete guide to DB2 universal database (excerpt)," 1998, Morgan Kaufmann Publishers, USA, XP002316820.

Don Chamberlin, "A Complete Guide to DB2 Universal Database," 1998 by Morgan Kaufmann Publisher, Inc, ISBN 1-55860-482-0, Chapter 7.5.1, Conservative Binding Semantics, pp. 435-455.

* cited by examiner

METHOD AND SYSTEM FOR A SELF-HEALING QUERY ACCESS PLAN

FIELD OF THE INVENTION

The invention relates to database management systems, and in particular, to automatic error recovery within such systems.

BACKGROUND OF THE INVENTION

Databases are used to store information for an innumerable number of applications, including various commercial, industrial, technical, scientific and educational applications. As the reliance on information increases, both the volume of information stored in most databases, as well as the number of users wishing to access that information, likewise increases. Moreover, as the volume of information in a database, and the number of users wishing to access the database, increases, the amount of computing resources required to manage such a database increases as well.

Database management systems (DBMS's), which are the computer programs that are used to access the information stored in databases, therefore often require tremendous resources to handle the heavy workloads placed on such systems. As such, significant resources have been devoted to increasing the performance of database management systems with respect to processing searches, or queries, to databases.

Improvements to both computer hardware and software have improved the capacities of conventional database management systems. For example, in the hardware realm, increases in microprocessor performance, coupled with improved memory management systems, have improved the number of queries that a particular microprocessor can perform in a given unit of time. Furthermore, the use of multiple microprocessors and/or multiple networked computers has further increased the capacities of many database management systems.

From a software standpoint, the use of relational databases, which organize information into formally-defined tables consisting of rows and columns, and which are typically accessed using a standardized language such as Structured Query Language (SQL), has substantially improved processing efficiency, as well as substantially simplified the creation, organization, and extension of information within a database. Furthermore, significant development efforts have been directed toward query "optimization", whereby the execution of particular searches, or queries, is optimized in an automated manner to minimize the amount of resources required to execute each query.

Through the incorporation of various hardware and software improvements, many high performance database management systems are able to handle hundreds or even thousands of queries each second, even on databases containing millions or billions of records. However, further increases in information volume and workload are inevitable, so continued advancements in database management systems are still required.

One area that has been a fertile area for academic and corporate research is that of improving the designs of the "query optimizers" utilized in many conventional database management systems. The primary task of a query optimizer is to choose the most efficient way to execute each database query, or request, passed to the database management system by a user. The output of an optimization process is typically referred to as an "execution plan," "access plan," or just "plan" and is frequently depicted as a tree graph. Such a plan typically incorporates (often in a proprietary form unique to each optimizer/DBMS) low-level information telling the database engine that ultimately handles a query precisely what steps to take (and in what order) to execute the query. Also typically associated with each generated plan is an optimizer's estimate of how long it will take to run the query using that plan.

An optimizer's job is often necessary and difficult because of the enormous number (i.e., "countably infinite" number) of possible query forms that can be generated in a database management system, e.g., due to factors such as the use of SQL queries with any number of relational tables made up of countless data columns of various types, the theoretically infinite number of methods of accessing the actual data records from each table referenced (e.g., using an index, a hash table, etc.), the possible combinations of those methods of access among all the tables referenced, etc. An optimizer is often permitted to rewrite a query (or portion of it) into any equivalent form, and since for any given query there are typically many equivalent forms, an optimizer has a countably infinite universe of extremely diverse possible solutions (plans) to consider. On the other hand, an optimizer is often required to use minimal system resources given the desirability for high throughput. As such, an optimizer often has only a limited amount of time to pare the search space of possible execution plans down to an optimal plan for a particular query.

Once a query plan is developed, it is passed to a database engine for execution. Database engines often include a number of built-in error reporting and error handling facilities. For example, when encountering an error that terminates execution of the query, typical database engines will report an error that includes some type of identifying code as well as the location in the query where the error occurred. In response to the error, the next step for the database user involves calling a customer support engineer and trying to resolve the problem via telephone or e-mail. This procedure is often very time consuming and frustrating for the user. Thus, there remains an unmet need to increase the number of alternative measures that a database user has available when encountering an error during execution of a database query. In particular, there remains the need in prior database environments for systems that automatically detect and attempt to fix errors when they occur.

SUMMARY OF THE INVENTION

Embodiments of the present invention include a self-healing database engine and optimizer framework that support automatically responding to execution errors to allow continued execution of a query plan. Upon encountering an execution error, the database engine automatically initiates a rebuilding of the query plan and executes the rebuilt execution plan. In some embodiments, if an error is encountered in the rebuilt query plan then the query implementation methods are analyzed. If a query function is identified for which an alternative implementation method is available, then this alternative implementation method is substituted to create a new query plan. The new query plan is then executed to determine if the error is corrected.

One aspect of the present invention relates to a method for automatic handling of errors within a database engine. In accordance with this method, an error is detected while executing a query access plan; and in response to detecting the error, the query access plan is automatically rebuilt to generate a new query access plan.

One more aspect of the present invention relates to a method for automatic handling of errors within a database engine. In accordance with this method, when an error is received while executing a query access plan, a first implementation method of that function is identified. The query access plan is rebuilt by replacing the first implementation method with a second implementation method of the function so as to generate a new query access plan.

DETAILED DESCRIPTION

As mentioned above, the embodiments discussed hereinafter utilize a database engine and optimizer framework that support automatically responding to execution errors to allow continued execution of a query plan. Upon encountering an execution error, the database engine automatically initiates a rebuilding of the query plan and executes the rebuilt execution plan. If an error is encountered in the rebuilt query plan then the query implementation methods are analyzed. If a query function is identified for which an alternative implementation method is available, then this alternative implementation method is substituted to create a new query plan. The new query plan is then executed to determine if the error is corrected. A specific implementation of such a database engine and optimizer framework capable of supporting this functionality in a manner consistent with the invention will be discussed in greater detail below. However, prior to a discussion of such a specific implementation, a brief discussion will be provided regarding an exemplary hardware and software environment within which such an optimizer framework may reside.

Figure 1:
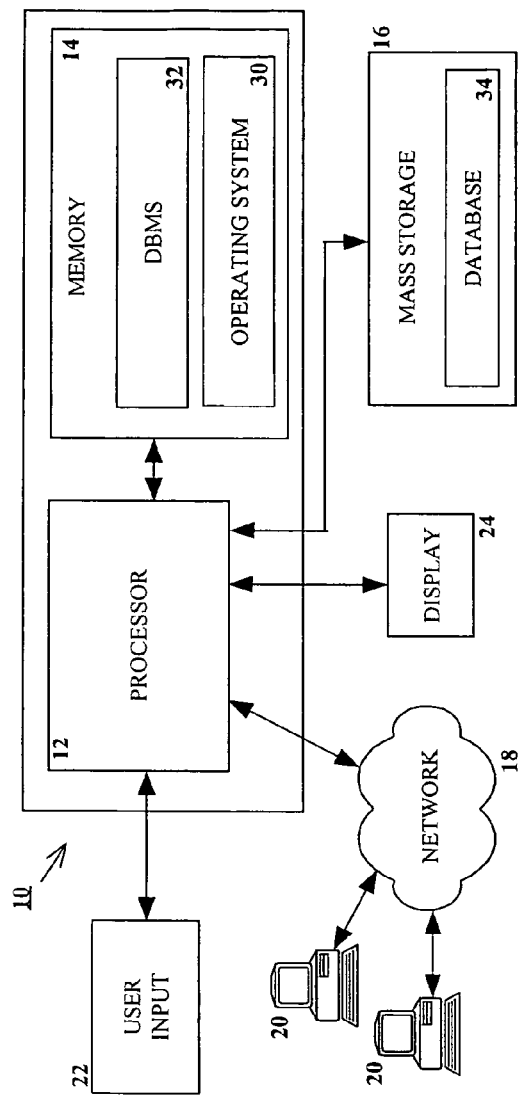
FIG. 1 is a block diagram of a networked computer system incorporating a database management system consistent with the invention.

Turning now to the Drawings, wherein like numbers denote like parts throughout the several views, FIG. 1 illustrates an exemplary hardware and software environment for an apparatus 10 suitable for implementing a database management system that automatic error responses consistent with the invention. For the purposes of the invention, apparatus 10 may represent practically any type of computer, computer system or other programmable electronic device, including a client computer, a server computer, a portable computer, a handheld computer, an embedded controller, etc. Moreover, apparatus 10 may be implemented using one or more networked computers, e.g., in a cluster or other distributed computing system. Apparatus 10 will hereinafter also be referred to as a "computer", although it should be appreciated the term "apparatus" may also include other suitable programmable electronic devices consistent with the invention.

Computer 10 typically includes at least one processor 12 coupled to a memory 14. Processor 12 may represent one or more processors (e.g., microprocessors), and memory 14 may represent the random access memory (RAM) devices comprising the main storage of computer 10, as well as any supplemental levels of memory, e.g., cache memories, non-volatile or backup memories (e.g., programmable or flash memories), read-only memories, etc. In addition, memory 14 may be considered to include memory storage physically located elsewhere in computer 10, e.g., any cache memory in a processor 12, as well as any storage capacity used as a virtual memory, e.g., as stored on a mass storage device 16 or on another computer coupled to computer 10 via network 18 (e.g., a client computer 20).

Computer 10 also typically receives a number of inputs and outputs for communicating information externally. For interface with a user or operator, computer 10 typically includes one or more user input devices 22 (e.g., a keyboard, a mouse, a trackball, a joystick, a touchpad, and/or a microphone, among others) and a display 24 (e.g., a CRT monitor, an LCD display panel, and/or a speaker, among others). Otherwise, user input may be received via another computer (e.g., a computer 20) interfaced with computer 10 over network 18, or via a dedicated workstation interface or the like.

For additional storage, computer 10 may also include one or more mass storage devices 16, e.g., a floppy or other removable disk drive, a hard disk drive, a direct access storage device (DASD), an optical drive (e.g., a CD drive, a DVD drive, etc.), and/or a tape drive, among others. Furthermore, computer 10 may include an interface with one or more networks 18 (e.g., a LAN, a WAN, a wireless network, and/or the Internet, among others) to permit the communication of information with other computers coupled to the network. It should be appreciated that computer 10 typically includes suitable analog and/or digital interfaces between processor 12 and each of components 14, 16, 18, 22 and 24 as is well known in the art.

Computer 10 operates under the control of an operating system 30, and executes or otherwise relies upon various computer software applications, components, programs, objects, modules, data structures, etc. (e.g., database management system 32 and database 34, among others). Moreover, various applications, components, programs, objects, modules, etc. may also execute on one or more processors in another computer coupled to computer 10 via a network 18, e.g., in a distributed or client-server computing environment, whereby the processing required to implement the functions of a computer program may be allocated to multiple computers over a network.

Figure 2:
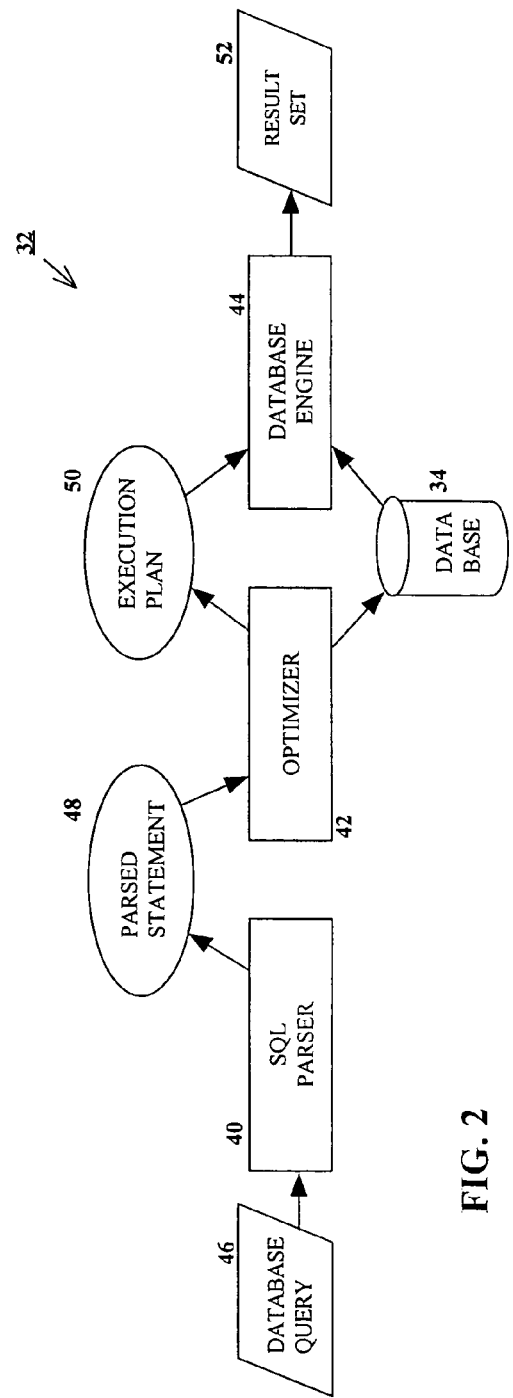
FIG. 2 is a block diagram illustrating the principal components and flow of information therebetween in the database management system of FIG. 1.

Turning briefly to FIG. 2, an exemplary implementation of database management system 32 is shown. The principal components of database management system 32 that are relevant to query optimization are an SQL parser 40, optimizer 42 and database engine 44. SQL parser 40 receives from a user a database query 46, which in the illustrated embodiment, is provided in the form of an SQL statement. SQL parser 40 then generates a parsed statement 48 therefrom, which is passed to optimizer 42 for query optimization. As a result of query optimization, an execution or access plan 50 is generated, often using data such as platform capabilities, query content information, etc., that is stored in database 34. Once generated, the execution plan is forwarded to database engine 44 for execution of the database query on the information in database 34. The result of the execution of the database query is typically stored in a result set, as represented at block 52.

Other components may be incorporated into system 32, as may other suitable database management architectures. Other database programming and organizational architectures may also be used consistent with the invention. Therefore, the invention is not limited to the particular implementation discussed herein.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various program code described hereinafter may be identified based upon the application within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the exemplary environment illustrated in FIGS. 1 and 2 is not intended to limit the present invention. Indeed, those skilled in the art will recognize that other alternative hardware and/or software environments may be used without departing from the scope of the invention.

Figure 3:
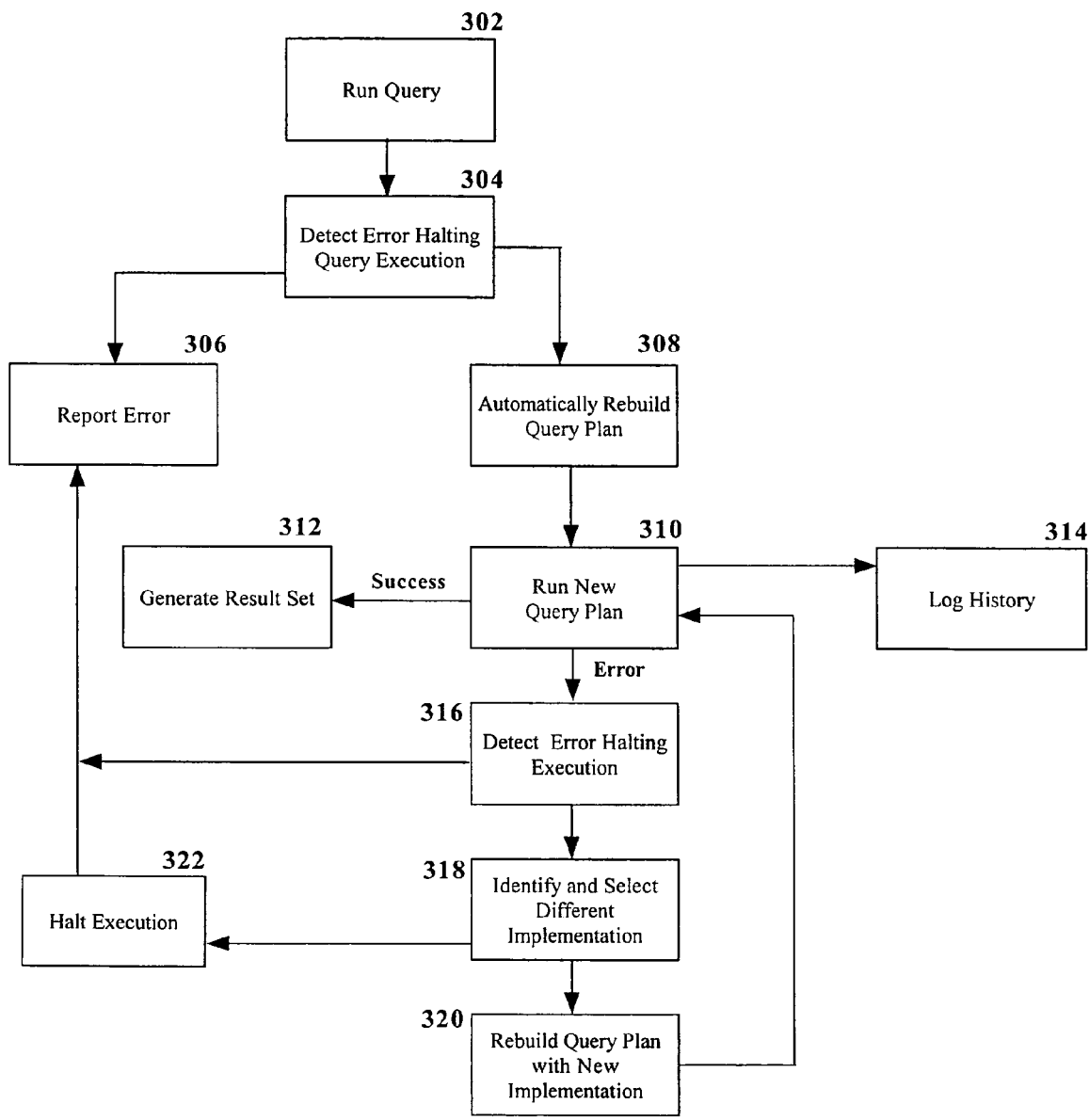
FIG. 3 illustrates a flowchart of an exemplary method automatically responding to execution errors according to embodiments of the present invention.

FIG. 3 illustrates a modification of the general flow depicted in FIG. 2. In particular, FIG. 3 illustrates a flowchart of an exemplary method for detecting and then automatically responding to errors that occur while executing a query plan. Accordingly, the flowchart starts in step 302 with running, or executing, the query plan. To reach this step, an SQL statement, or more likely a series of SQL statements, were first passed through the SQL parser 40 and the optimizer 42 to generate the query plan 50. During execution, the database engine 44 may, in step 304, detect an error that halts execution of the query. Within some database environments, such an error is known as a function check. A number of different such errors may be detected; some relate to opening various tables; some relate to formatting the result set; some relate to problems with selection criteria; and many other types of errors are possible as well. In response to the error, the database engine 44 reports, in step 306, the error to a user. Typically, the error is reported to a display screen 24 and to a log file (not shown). The error report includes the type of error that occurred as well as where in the query plan the error occurred.

In addition to simply reporting the error, the database engine also initiates rebuilding of the query plan, in step 308. Historical analysis of many customer service reports have indicated that a number of errors can be temporarily, or even permanently, corrected by rebuilding the query plan. Thus, in step 308, the database engine returns control to the SQL parser 40 which retrieves the database query 46 from permanent or temporary storage. The SQL parser 40 then re-generates the parsed statement 48 and forwards it to the optimizer 42 so that a new query plan, or execution plan, 50 is generated. This new query plan is not necessarily different than the original query plan as it is a rebuilding of the same database query 46. Alternatively, the original parsed statement may be retrieved and passed to the optimizer 42 without explicitly running the database query 46 through the SQL parser 40.

The new query plan is then executed, in step 310, by the database engine. There are two possible outcomes of running the new query plan: either it succeeds and a result set is generated, in step 312, or it fails again and an error is once again detected, in step 316, that halts execution of the query. Also, a log may be updated, in step 314, that tracks the execution results and errors that are encountered while executing this query plan. For example, the historical log may include the type of error, the location of the error, and whether rebuilding was successful. While this log is routinely stored local to the computer on which the database engine is executing, it may also be transmitted to remote systems such as, for example, for diagnostic purposes and for tracking customer service issues.

If running the rebuilt query plan results in the detection of an error in step 316, then a second level of automatic error response is initiated that identifies and selects a different implementation method for a portion of the query. As before, the error is reported in step 306 and then control passes to the optimizer 42 for further analysis of the error. The level-of-detail at which an error can be detected allows the optimizer 42 to focus on how a query is implemented. For example, there are normally at least two "opposing" methods of implementing various portions, or functions, of a query. When performing optimization to build the query plan, the optimizer selects from among these different implementation methods. One exemplary function within a query is a GROUP BY clause; this clause aggregates records in a result set according to a unique value for a field of table. Two different methods for implementing the grouping function within a query plan are "group by hash" and "group by index".

When a query is running, in step 310, and an error is detected, in step 316, that error may indicate that there is a problem with performing a particular function of the query such as, for example, the grouping function. Accordingly, the optimizer 42, in step 318, identifies that the query plan implements the grouping function using, for example, the "group by hash" method and determines that an equivalent implementation method would be the "group by index" method. With the alternative implementation method now identified, the optimizer 42 builds a new query plan, in step 320, with the alternative implementation method. In some instances, the query function where the error occurs may not have another alternative implementation method to substitute. In those cases, the error halts execution of the query, in step 322, and the error is reported, in step 306. At this point the user can follow more traditional procedures for addressing the error.

With the rebuilt query plan that includes the alternative implementation method, the database engine runs the query, in step 310. As there are often more than one alternative implementation method for a particular query function, steps 310-320 can be repeated until all alternatives have been exhausted or a result set is successfully generated. As a result of this method, a database system will attempt to automatically address errors that otherwise would have resulted in an unexecutable application and the need to call customer support.

In a robust database system there are hundreds of different query functions with alternative implementation methods that an optimizer chooses from when building a query plan. Even though an exhaustive list of the different functions and their alternative implementation methods are not explicitly included herein, the above-described method contemplates, when appropriate, rebuilding a query plan with alternative implementation methods for any of the wide variety of functions likely to be encountered in a query plan. For example, an ordering function may be implemented using "order by index" or "order by sort"; a grouping function may be implemented using "group by hash" or "group by index"; and a join function may be implemented using either a nested loop method or a hashing method. Additionally, when handling a subquery function, the optimizer may implement it as a "join" or as a separate subquery; or when coding a view function in the query plan, the optimizer can implement the view function using a method known as "materialization" or an alternative method known as "merge". Other exemplary functions include such functions as hash, view, host variables, parameter markers, literals, nested loop, materialization, sort, bit map, sub query, sparse index, merge, and table scan. These are just a few exemplary functions for which an optimizer selects from among alternative implementation methods when generating a query plan.

Execution errors sometimes occur because of problems in the database engine 44 or the optimizer 42. In these instances, a "patch" is typically issued from the database vendor that addresses the problems. The term patch is used generally to refer to program fixes that modify a fielded application and is not intended as a limitation to a particular method of fixing the application. The program fixes resulting from applying a patch are typically permanent in nature and correct one or more problems without requiring re-installation of an entire application. In the past, a database user would receive a patch that consisted of executable code that the user would install to modify the database engine 44 or the optimizer 42 applications. The patch also included documentation as to what types of problems it solves and what types of queries may be affected. For example, the patch may indicate that it addresses files in which there is a single file query, that does a hashing grouping and casts to a Date type.

When a query plan is executed, it will typically check to see if a patch has been installed that may implicate features of that query plan. If a determination is made that the patch does apply to this query plan, then the query initiates a rebuilding operation that results in a new query plan being built that takes advantage of the patch. Conventionally, some type of flag or identifier is added to the query plan so that it is aware that it has already been rebuilt with that particular patch so as to avoid redundant rebuilding. The methods described above with respect to FIG. 3, provide a performance advantage over this conventional way of applying patches, or program fixes.

In particular, following the conventional methods, a number of query plans may be rebuilt that did not necessarily require rebuilding. To ensure that as many possible problematic query plans are rebuilt, the determination of whether a query plan is implicated by a particular patch is made overly broad. Thus, a number of the query plans that are identified as possibly being implicated by a patch would, in actuality, continue to execute without errors or failures just as they are.

Implementation of the methods of FIG. 3 avoids unnecessarily rebuilding a query plan. If the query plan encounters no errors during execution, then it is not rebuilt. However, if an error is encountered, then, in step 308, the query plan is rebuilt with the advantage of any patches that have been installed. Thus, only query plans than encounter problems are rebuilt. Avoiding the unnecessary rebuilding of a query plan will improve the speed and performance of the query from the perspective of the user. This performance advantage is multiplied in environments in which many parallel jobs are executing. Each of these jobs may involve the same query plan and, therefore, may result in multiple attempts to rebuild the same query plan while other jobs are attempting to do the same. Conventionally, a query plan must be exclusively locked before being changed which is difficult to do with contending jobs. As a result of these contentious circumstances, the apparent performance of each of these jobs is degraded. However, by using the methods described above with respect to FIG. 3, these contentious circumstances between parallel jobs can be avoided thereby avoiding any performance degradations.

Various modifications may be made to the illustrated embodiments without departing from the spirit and scope of the invention. For example, the automatic rebuilding of the query plan does not necessarily have to precede the identification and substitution of alternative implementation methods for a query function causing an error. In this alternative self-healing framework, the first time an error is encountered, the rebuilding step may be skipped and an alternative implementation method substituted immediately in the new query plan. Also, the historical log from step 314 may alternatively include a wide variety of information about the query and the automatic attempts to address the error that was encountered. For example, the log can contain the query itself, the system-level variables and their values at the time the query ran; the index or indices used in the query; the error message; and the log of the attempts to fix the error. This type of information is useful for customer support organization to help diagnose and resolve the error with a more permanent fix. Therefore, the invention lies in the claims hereinafter appended.

What is claimed is:

1. A method for automatic handling of errors within a database engine, the method comprising the steps of:

detecting an error while executing a query access plan, wherein the error is an execution error of a type that halts execution of the query access plan, wherein the query access plan is of the type generated by a query optimizer, wherein the query access plan is generated prior to installation of a patch to at least one of the database engine and the query optimizer, wherein the patch comprises a program fix including executable code that modifies at least one of the database engine and the query optimizer, and wherein detecting the error is performed after installation of the patch;

in response to detecting the error, automatically rebuilding the query access plan with the query optimizer to generate a new query access plan, wherein the new query access plan is generated after installation of the patch; and executing the new query access plan to generate at least a portion of a result set for storage or display.

2. The method of claim 1, wherein the error is a function check.

3. The method of claim 1 further comprising the steps of:

receiving another error while executing a function within the new query access plan;

identifying a first implementation method of the function within the new query access plan; and rebuilding the new query access plan by replacing the first implementation method with a second implementation method of the function so as to generate a rebuilt query access plan.

4. The method according to claim 1, further comprising the step of:
logging information about the error, and the new query access plan.

5. The method according to claim 1, further comprising the step of:
reporting the error.

6. A method for automatic handling of errors within a database engine, the method comprising the steps of:
halting execution of a query access plan in response to receiving an error while executing a function within the query access plan, wherein the error is an execution error of a type that halts execution of the query access plan and that results in an unexecutable application if unaddressed, and wherein the query access plan is of the type generated by a query optimizer, wherein the query access plan is generated prior to installation of a patch to at least one of the database engine and the query optimizer, wherein the patch comprises a program fix including executable code that modifies at least one of the database engine and the query optimizer, and wherein the error is received after installation of the patch;
identifying a first implementation method of the function within the query access plan;
automatically and without manual intervention, rebuilding the query access plan with the query optimizer by replacing the first implementation method with a second implementation method of the function so as to generate a new query access plan, wherein the new query access plan is generated after installation of the patch; and
automatically and without manual intervention, executing the new query access plan to generate at least a portion of a result set for storage or display.

7. The method of claim 6, wherein the function is one of a join function, an indexing function, a grouping function, and an ordering function.

8. The method of claim 6, further comprising the steps of:
receiving another error while executing the function within the new query access plan; and
rebuilding the new query access plan by replacing the second implementation method with a third implementation method of the function.

9. The method according to claim 8 further comprising the step of:
logging information about the error, the another error, and the new query access plan.

10. A method for automatic handling of errors within a database engine, the method comprising the steps of:
executing a query access plan comprising a plurality of functions, each function including a first implementation method, and the query access plan of the type generated by a query optimizer;
halting execution of the query access plan in response to detecting a first error when executing a first function, wherein the first error is an execution error of a type that halts execution of the query access plan and that results in an unexecutable application if unaddressed, wherein the query access plan is generated prior to installation of a patch to at least one of the database engine and the query optimizer, wherein the patch comprises a program fix including executable code that modifies at least one of the database engine and the query optimizer, and wherein the error is detected after installation of the patch;
automatically and without manual intervention, performing a first level of automatic error response by rebuilding the query access plan with the query optimizer to generate a new query access plan, wherein the new query access plan is generated after installation of the patch;
executing the new query access plan to generate at least a portion of a result set for storage or display;
halting execution of the new query access plan in response to receiving a second error while executing the first function within the new query access plan; and
automatically and without manual intervention, performing a second level of automatic error response by rebuilding the new query access plan by replacing the first implementation method with a second implementation method of the function.

11. A method for automatic handling of errors for a database management system, the method comprising:
building a first query access plan for a first query with a query optimizer of the database management system;
executing the first query access plan with a database engine of the database management system;
building a second query access plan for a second query with the query optimizer;
executing the second query access plan with the database engine;
after building and executing the first and second query access plans, installing a patch to the database management system, wherein the patch applies to the first and second query plans, and wherein the patch comprises a program fix including executable code that modifies at least one of the query optimizer and the database engine;
executing the first query access plan after installing the patch;
detecting an error while executing the first query access plan after installing the patch, wherein the error is an execution error of a type that halts execution of the first query access plan;
in response to detecting the error, automatically rebuilding the first query access plan with the query optimizer to generate a new query access plan, wherein the new query access plan is generated after installation of the patch;
executing the new query access plan to generate at least a portion of a first result set for storage or display; and
executing the second query access plan after installing the patch, wherein executing the second query access plan after installing the patch includes executing the second query access plan without rebuilding the second query access plan and generating at least a portion of a result set for storage or display.

* * * * *